United States Patent

Sakamoto

[11] Patent Number: 6,157,414
[45] Date of Patent: Dec. 5, 2000

[54] IMAGE DISPLAY APPARATUS FOR ENLARGEMENT OR REDUCTION OF AN IMAGE USING AN INTERPOLATION PROCESS

[75] Inventor: Susumu Sakamoto, Tokyo, Japan

[73] Assignee: NEC Corporation, Tokyo, Japan

[21] Appl. No.: 09/135,298

[22] Filed: Aug. 17, 1998

[30] Foreign Application Priority Data

Aug. 25, 1997 [JP] Japan ................................. 9-227769

[51] Int. Cl.[7] .............................. G06K 9/36; G06K 9/32; H04N 7/36
[52] U.S. Cl. ......................... 348/581; 348/445; 348/556; 348/561; 348/704; 348/913; 382/298; 382/299; 382/300; 382/276
[58] Field of Search ..................... 348/581, 556, 348/561, 458, 445, 439, 240, 913, 704, 448, 222, 193, 699; 382/300, 298, 302, 233, 236, 232, 238, 239; 345/127, 129, 130, 136, 138, 433; 386/109

[56] References Cited

U.S. PATENT DOCUMENTS

| | | | |
|---|---|---|---|
| 5,247,357 | 9/1993 | Rhoads | 348/418 |
| 5,504,823 | 4/1996 | Yoon | 382/233 |
| 5,561,608 | 10/1996 | Shimoda | 348/420 |
| 5,701,369 | 12/1997 | Moon | 348/97 |
| 5,784,526 | 7/1998 | Shimoda | 348/397 |
| 5,790,264 | 8/1998 | Sasaki | 348/420 |
| 5,825,929 | 10/1998 | Chen | 348/193 |
| 5,864,787 | 1/1999 | Ito | 382/298 |
| 5,959,673 | 10/1999 | Lee | 348/402 |
| 5,970,173 | 10/1999 | Lee | 348/699 |

FOREIGN PATENT DOCUMENTS

| | | |
|---|---|---|
| 62-154880 | 7/1987 | Japan . |
| 1-155393 | 6/1989 | Japan . |
| 2-122767 | 5/1990 | Japan . |
| 3-204268 | 9/1991 | Japan . |
| 4-326183 | 11/1992 | Japan . |
| 5-167920 | 7/1993 | Japan . |
| 6-54172 | 2/1994 | Japan . |
| 6-225213 | 8/1994 | Japan . |
| 6-325163 | 11/1994 | Japan . |
| 7-44699 | 2/1995 | Japan . |
| 7-154681 | 6/1995 | Japan . |
| 8-223479 | 8/1996 | Japan . |

Primary Examiner—Jeffery Brier
Assistant Examiner—Wessner Sajous
Attorney, Agent, or Firm—Scully, Scott, Murphy & Presser

[57] ABSTRACT

An image display obtains a high quality enlarged or reduced image, by making the output image almost the same level of the inputted image. An inputted image signal is transmitted to a discrete cosine transformer and transformed to frequency band information. The image information transformed to the frequency band is transmitted to a memory controller and stored in a frame buffer. Image information read out from the memory controller is implemented enlargement/reduction interpolation at an enlargement/reduction interpolation section. The image information enlarged or reduced is transmitted to a reverse discrete cosine transformer and restored to image information and then outputted. In this image display, even the image is enlarged or reduced, the part of frequency of the image is kept as it is, the deterioration of the image quality is decreased largely.

6 Claims, 7 Drawing Sheets

BI-LINEAR INTERPORATION

ORIGINAL
IMAGE DATA

FREQUENCY
BAND

DIVIDED TO
FREQUENCY BAND

IMAGE DISPLAY APPARATUS FOR ENLARGEMENT OR REDUCTION OF AN IMAGE USING AN INTERPOLATION PROCESS

BACKGROUND OF THE INVENTION

The present invention relates to an image display, in particular at the time of enlargement or reduction of an image, image data are displayed by the implementation of an interpolation process.

DESCRIPTION OF THE RELATED ART

In the conventional display, the enlargement or reduction of an A layer signal of NTSC etc. at the time of displaying on a display of such as computer has been implemented by the interpolation utilizing original dot information that an image is digitalized by a line buffer or FIFO and so on. The interpolation of reduction is implemented by the dot information given by a filter. With regard to the interpolation of reduction, there are two methods, one is that the dot information given by the filter is added to the right and left dot information that remains in a screen and the other is that the dot information is thinned out simply. The interpolation of enlargement is implemented by taking the correlation with upper and lower display lines at the time of output in both vertical and horizontal directions and by a simple calculation.

Next, the conventional enlargement/reduction image display is explained based on an example of the Japanese Patent.

FIG. 1 shows the Japanese Patent Laid-Open Ser. No. 7-154681 as a conventional example. Referring to FIG. 1, an image signal inputted from an image input 101 is transmitted to an analog digital converter 102. The analog digital converter 102 is connected to a memory controller 104 provided a frame buffer 105. The memory controller 104 is connected to enlargement/reduction interpolation section 106, this enlargement/reduction interpolation section 106 is connected to a digital analog converter 108. In this conventional display, an image signal inputted from the image input 101 is digitalized at the analog digital converter 102, and this signal is inputted to and outputted from the frame buffer 105 at the memory controller 104. The interpolation at enlargement or reduction is implemented at the enlargement/reduction interpolation 106 after reading image data from the memory controller 104.

As the other conventional examples, there are such as the Japanese Patent Laid-Open Ser. No. 8-223479, Ser. No. 1-155393 and Ser. No. 62-154880, FIG. 2 shows these examples of enlargement/reduction image display.

Referring to FIG. 2, an image signal inputted from an image input 101 is transmitted to an analog digital converter 102. The analog digital converter 102 is connected to a memory controller 104 via a reduction interpolation section 113, the memory controller 104 provides a frame buffer 105. An enlargement interpolation section 114 is connected to the memory controller 104, a digital analog converter 108 is connected to this enlargement interpolation section 114. In FIG. 1, both enlargement and reduction interpolation are implemented all together in one section, however in FIG. 2, this interpolation process is separated into two steps, reduction interpolation is implemented before storing into the frame buffer 105, enlargement interpolation is implemented after storing into the frame buffer 105. In every case, digitalized image data are used as it is at the enlargement or reduction of interpolation. The interpolation system is a bi-linear interpolation system or a calculation system applied such as multiplication and addition weighting the digitalized image data at the interpolation.

Referring to FIGS. 3A, 3B and 3C, in the conventional display, an analog signal of the inputted image and an example of error occurrence by the interpolation algorithm at the enlargement of sampling data are explained. The bi-linear interpolation system is the system that interpolates data between both sides of digitalized data linearly in case of making interpolation data between digitalized data. FIG. 3A shows original data. In FIG. 3B, A is one of original data, B is one of interpolation data interpolating the original data and C is an error part of the original data. Like this, the error part is rather big for the original data in this system. As mentioned above, the image interpolated in enlargement or reduction is converted from a digital signal to an analog signal at a digital analog converter 108 and outputted from an image output 109.

However, in the conventional enlargement/reduction display, the data made by the interpolation at the time of enlargement or reduction are liable to make a big error for the original input image and an image deterioration is liable to be noticeable.

SUMMARY OF THE INVENTION

It is therefore an object of the present invention to obtain an enlargement/reduction high quality image, by making the enlarged or reduced image almost the same image as the image inputted shooting in enlargement/reduction in an analog area.

According to the present invention, there is provided an image display comprising, an image input means, an analog digital converter means for converting an analog image signal to digital image data, a frame buffer means for buffering a digital image, a memory controller means for implementing input/output to the frame buffer, an enlargement/reduction interpolation means for implementing enlargement/reduction interpolation of an image, a digital analog converter means for converting the digital image data to the analog image signal, an image output means for outputting said analog image signal, a frequency band information transformer means for transforming said digital image data to frequency band information and a reverse frequency band information transformer means for restoring the image from the frequency band information.

With this constitution, by interpolating the frequency band information directly in the vertical and horizontal direction at the time of enlargement or reduction, the same level of quality in case of enlargement or reduction of the video image in the analog area is obtained.

At the time of taking the image in, the image information is divided to each frequency band and stored in the frame buffer, in the frequency band information which the inputted image has, the bi-linear interpolation is applied to each frequency band, keeping continuity of the frequency band information having in the image, the enlargement/reduction is implemented, after this, a circuit producing the image information from the frequency band is provided. At the time of reduction, eliminating the upper band information than realized by the reduction ratio, a folded quantization noise is decreased.

Further, the present invention provides an elimination means for eliminating the image in each frequency band, after transforming the image to the frequency band information temporarily by said frequency band information transformer means, in which an expressable frequency band lowers and a low pass filter preventing an occurrence of a folded quantization noise is realized, at the time of reduction of the image.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
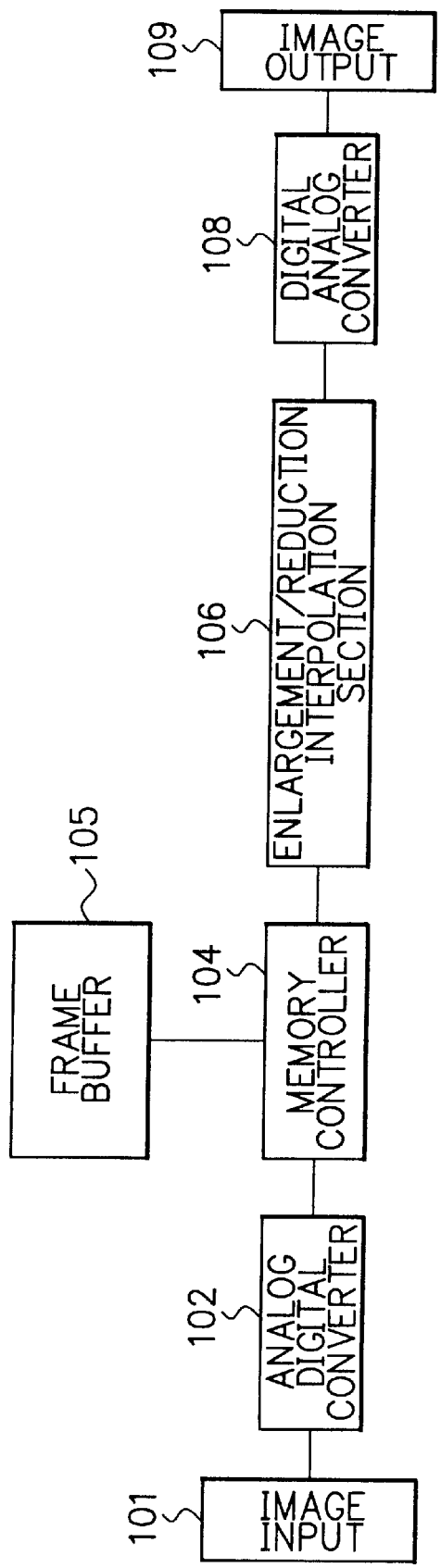
FIG. 1 is a block diagram of the conventional image enlargement/reduction display.
Figure 2:
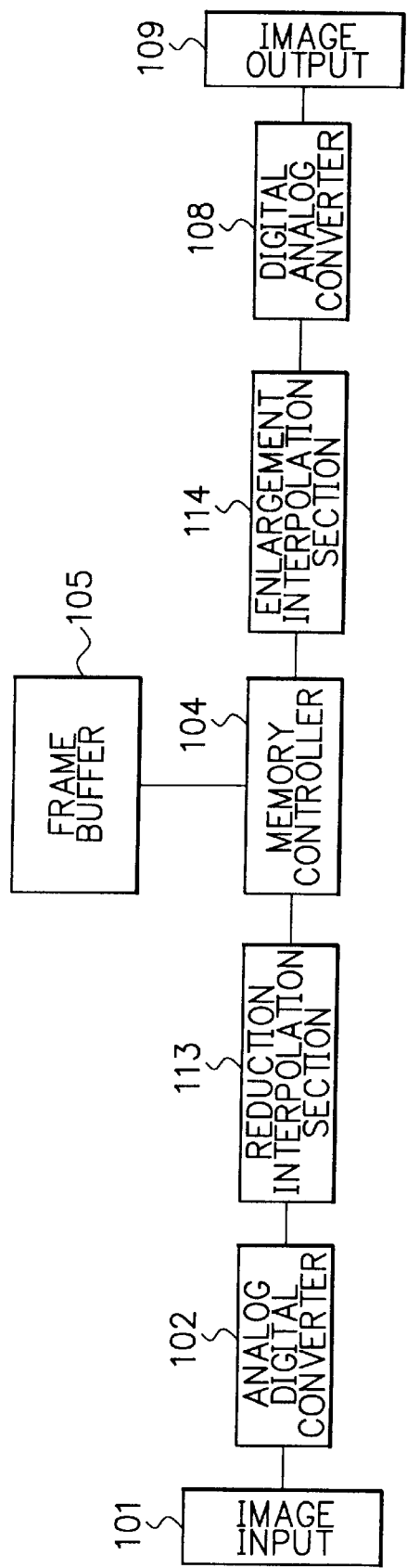
FIG. 2 is a block diagram of the conventional image enlargement/reduction display, enlargement and reduction interpolation sections are separated.
Figure 3A:
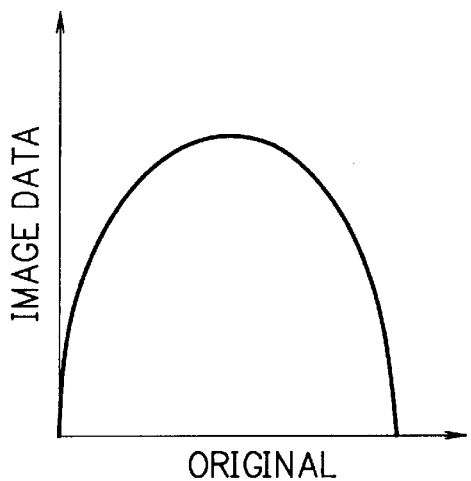
FIG. 3A is a diagram showing original image data in an example of an error occurrence at the interpolation of the conventional image enlargement/reduction display.
Figure 3B:
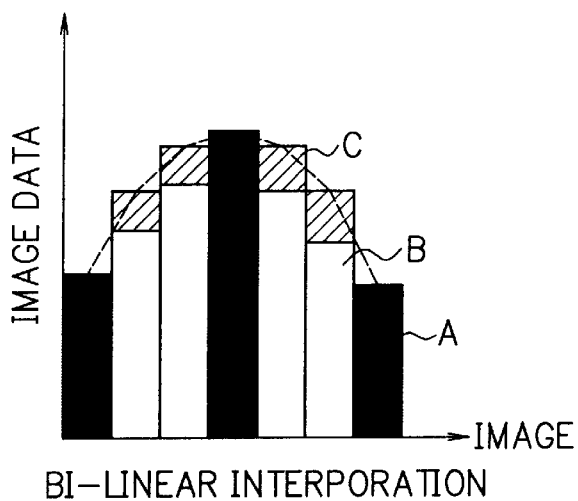
FIG. 3B is a diagram showing an example of an error occurrence at the interpolation of the conventional image enlargement/reduction display.
Figure 3C:
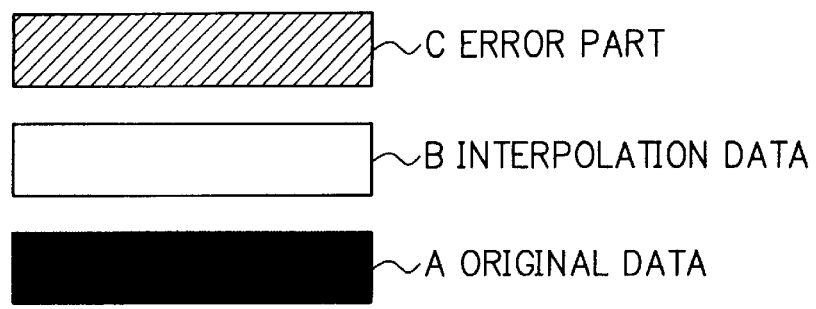
FIG. 3C is a diagram showing a meaning of signs A, B and C in FIG. 3B.

Referring now to the drawings, a description of preferred embodiments of the present invention will be given in detail.

Figure 4:
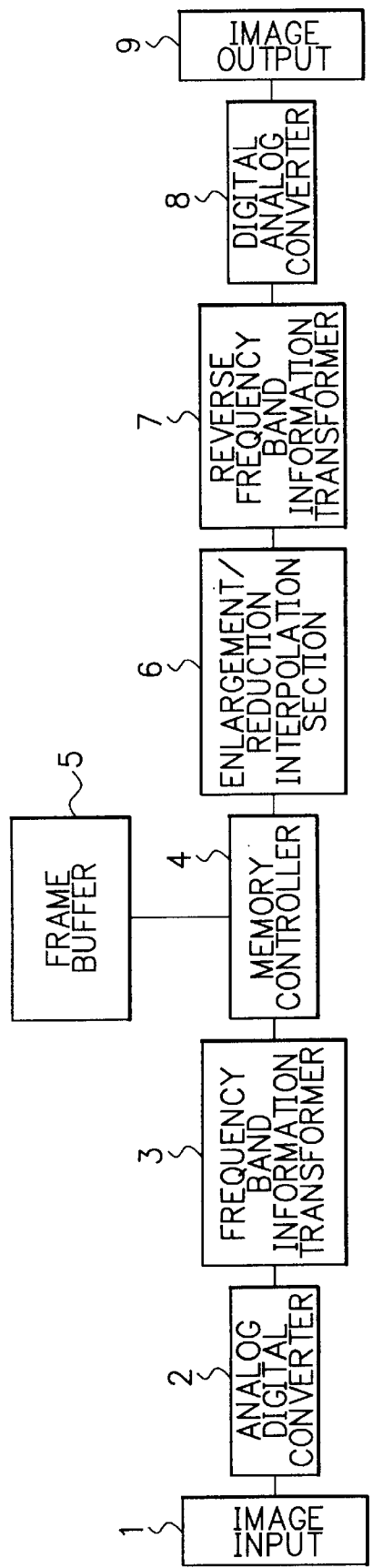
FIG. 4 is a block diagram showing an image display of the present invention.

A first embodiment of the present invention is explained. FIG. 4 is a block diagram showing a first embodiment of the present invention. An image input 1 is an analog image signal input and an analog image signal is transmitted from, for example, the video equipment such as TV, VCR and LD (Laser Disk). The analog image signal is transmitted to an analog digital converter 2 in which the analog image signal is converted to digital image data. The analog digital converter 2 is connected to a frequency band information transformer 3, the frequency band information transformer 3 is connected to a memory controller 4, the memory controller 4 provides a frame buffer 5. An enlargement/reduction interpolation section 6 is connected to the memory controller 4. An image is outputted from an image output 9 via this enlargement/reduction interpolation section 6, a reverse frequency band information transformer 7 and a digital analog converter 8. The image signal is transmitted to the frequency band information transformer 3 via the analog digital converter 2. The image information divided into the frequency band information is inputted to the frame buffer 5 via the memory controller 4 temporarily. In accordance with the request of the enlargement/reduction interpolation section 6, the memory controller 4 reads the divided image data in the frequency band information from the frame buffer 5 and transmits to the enlargement/reduction interpolation section 6. At the enlargement/reduction interpolation section 6, based on the frequency band information of the image data, the enlargement/reduction interpolation is implemented in each frequency band. At the time of reduction, the frequency band which is upper than a realizable band is eliminated. The interpolated frequency band information is restored to the image data interpolated at the reverse frequency band information transformer 7. The transformed digital image data is converted to the analog image signal at the digital analog converter 8 and outputted from the image output 9.

Figure 5:
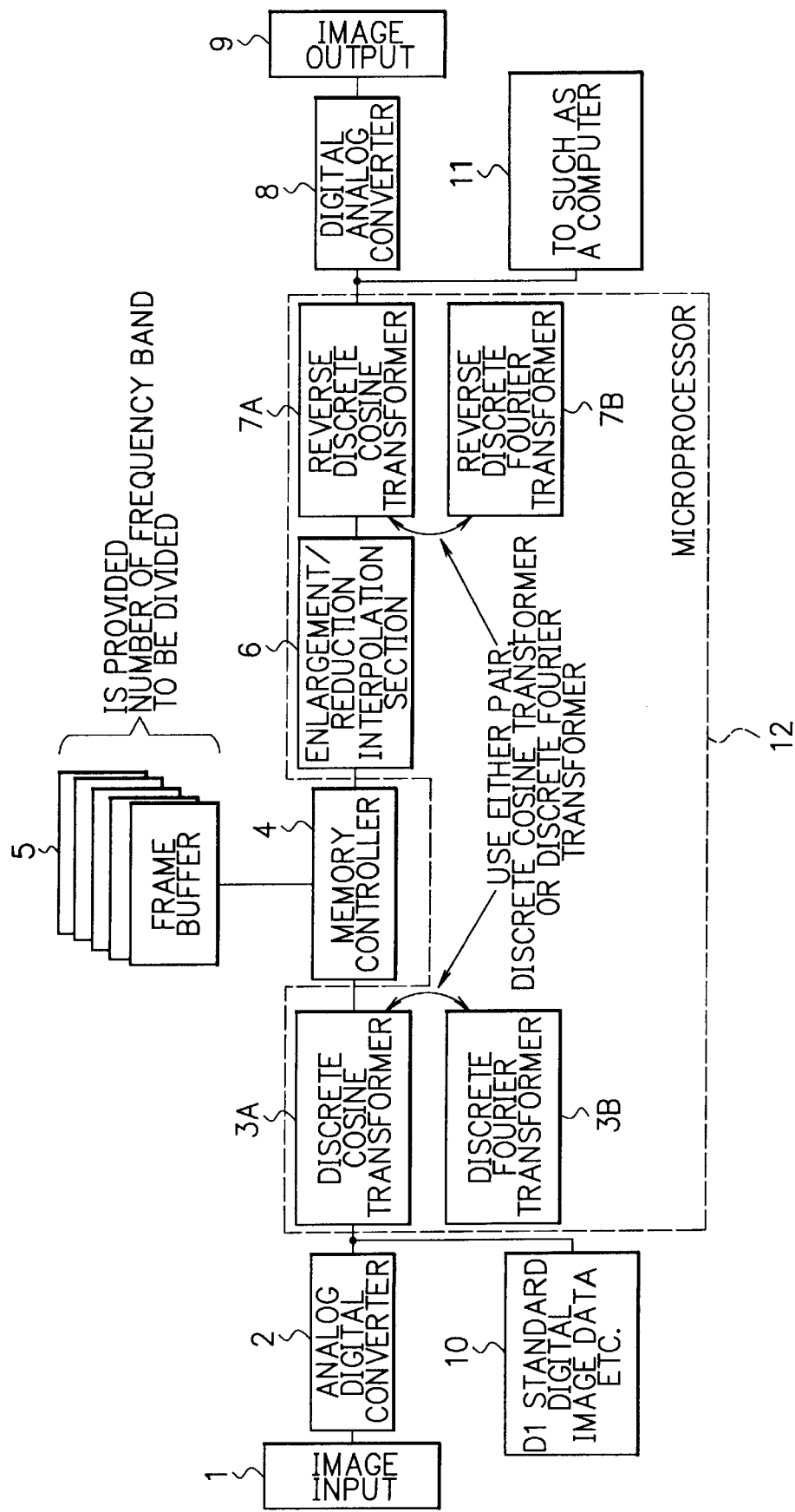
FIG. 5 is a block diagram showing an embodiment of an image display of the present invention.

Referring to FIG. 5, a second embodiment of the present invention is explained in detail. At first, an image signal from video equipment such as VCR and LD is inputted to an image input 1. The image signal is transmitted to an analog digital converter 2 where the signal is converted to digital image data. A discrete cosine transformer 3A is connected to the analog digital converter 2, a memory controller 4 is connected to the discrete cosine transformer 3A, the memory controller 4 provides a frame buffer 5. An enlargement/reduction interpolation section 6 is connected to the memory controller 4, an image is outputted at an image output 9 via a reverse discrete cosine transformer 7A connected to the enlargement/reduction interpolation section 6 and a digital analog converter 8. The image signal transmitted to the analog digital converter 2 is converted from analog information to digital information at the analog digital converter 2. At this analog digital converter 2, the image information over a sampling frequency is eliminated. At the output side of the analog digital converter 2, output data 10 of a digital video recorder such as D1 standard are possible to be inputted.

Figure 6A:
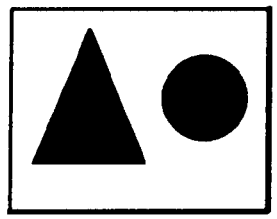
FIG. 6A shows original image information which is divided into the frequency band information of the present invention.
Figure 6B:
FIG. 6B shows image information divided into the frequency band information of the present invention.

FIGS. 6A and 6B show a rough concept of the image information transformed to the frequency band information. FIG. 6A is original data and FIG. 6B is the image information divided to the frequency band information at the discrete cosine transformer 3A.

Figure 7:
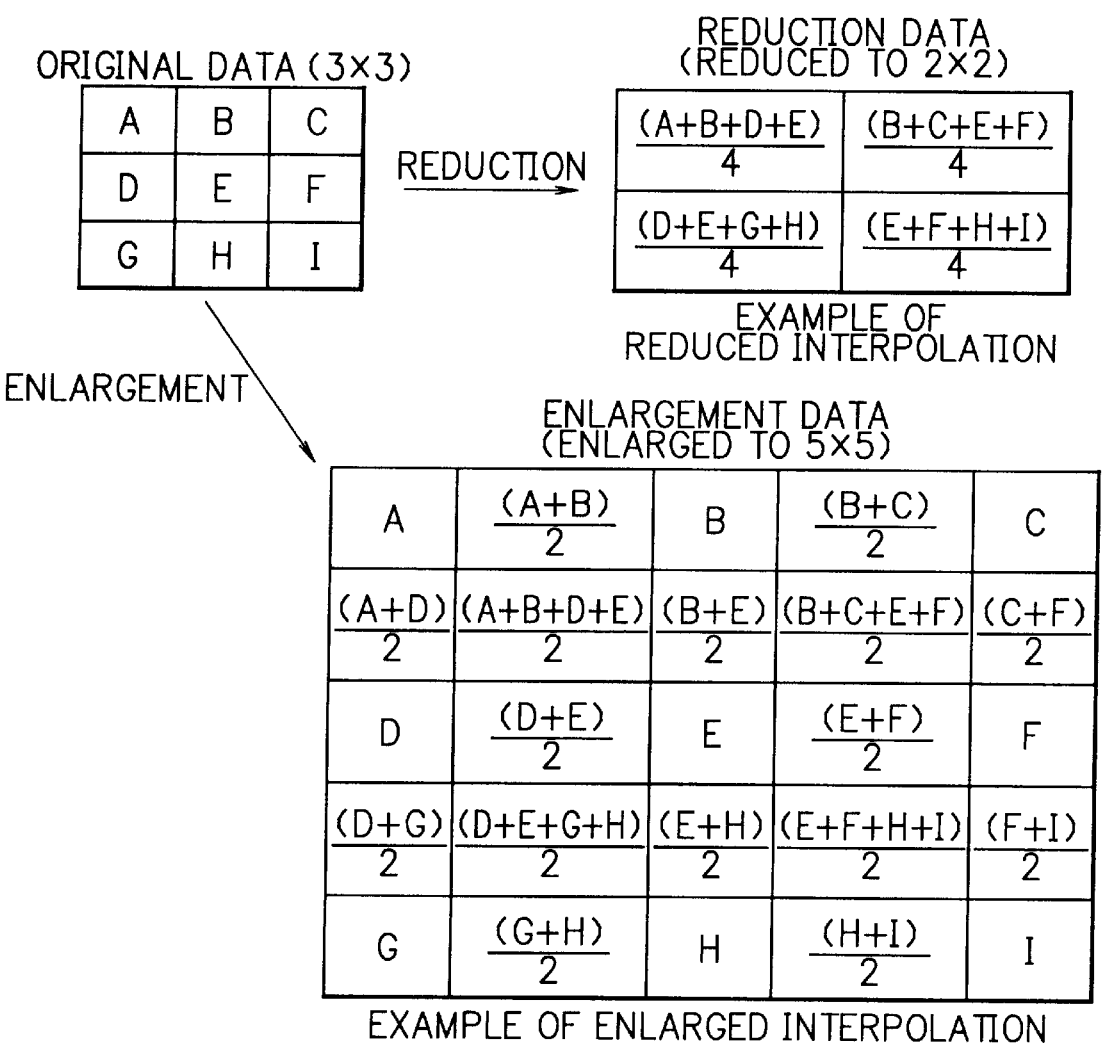
FIG. 7 shows a calculation example calculating the interpolation in each frequency band at the time of enlargement/reduction in the frequency band information of the present invention.

The image information transformed to the frequency band information are stored to the frame buffer 5 from the memory controller 4. The frame buffer 5 provides the necessary number of divided frequency bands that are divided by the frequency band information at the discrete cosine transformer 3A. According to the request of the enlargement/reduction interpolation section 6, the memory controller 3 reads the necessary information from the frame buffer 5 and transmits to the enlargement/reduction interpolation section 6. The enlargement/reduction interpolation section 6 reads the necessary part at the time of enlargement or reduction from the frame buffer 5, in each frequency band of the image, as shown in FIG. 7, the necessary part of enlargement/reduction interpolation is implemented. At the reduction, the frequency band information over the expressable frequency band is not read and a low pass filter is realized, high band information is cut and an occurrence of folded quantization noise is prevented. The frequency band information which image is interpolated in enlargement or reduction becomes again the image information from the frequency band information at the reverse discrete cosine transformer. Next, this image information is converted to an analog signal from a digital signal at the digital analog converter 8, the image interpolated in enlargement or reduction is outputted from the image output 9. With an action of the signal which is to be transmitted to the digital analog converter 8 is transmitted to such as a computer 11, it is applicable to an apparatus taking high quality image.

In a second embodiment, as a method transforming to the frequency band information, the discrete cosine transformer is applied, however a discrete Fourier transformer is applicable. Referring to FIG. 5 again, in a third embodiment, instead of using the discrete cosine transformer 3A, the discrete Fourier transformer 3B is applied. The memory controller 4 is connected to the discrete Fourier transformer 3B, the memory controller 4 provides the frame buffer 5. The enlargement/reduction interpolation section 6 is connected to the memory controller 4, the image is outputted from the image output 9 via the reverse discrete Fourier transformer 7B connected to the enlargement/reduction interpolation section 6 and the digital analog converter 8. The image signal transmitted to the analog digital converter 2 is converted to digital information from analog information at the analog digital converter 2. At this analog digital converter 2, the image information over the band of sampling frequency is eliminated. As mentioned above, the image information is divided to the frequency band information at the discrete Fourier transformer 3B. The frequency band information of the image interpolated in enlargement or reduction at the enlargement/reduction interpolation section 6 becomes again image information from frequency band information at the reverse discrete Fourier transformer 7B. And the interpolated image is converted from digital to analog at the digital analog converter 8 and outputted from the image output 9.

As another embodiment, a group of the discrete cosine transformer 3A, the enlargement/reduction interpolation section 6 and the reverse discrete cosine transformer 7A or a group of the discrete Fourier transformer 3B, the enlargement/reduction interpolation section 6 and the reverse discrete Fourier transformer 7B is possible to be realized by a microprocessor 12. The other functions are the same as the above mentioned the second and the third embodiments. By using the microprocessor 12, the total system is possible to be simplified.

As mentioned above, in the present invention, at the time of enlargement or reduction, the frequency band information is interpolated by the bi-linear interpolation in the direction of vertical and horizontal, the continuity of the frequency band information is possible to be kept, the same level of high quality image data as of the case that video image is enlarged or reduced in an analog area are obtained.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image display, comprising:

an image input means for inputting an analog image signal;

an analog to digital converter means for converting the analog image signal to digital image data;

a frequency band information transformer means for transforming said digital image data into frequency band information;

a frame buffer means for buffering the frequency band information of the digital image data;

a memory controller means for implementing input/output of the frequency band information to the frame buffer;

an enlargement/reduction interpolation means for implementing enlargement/reduction interpolation for each frequency band of the frequency band information output by the memory controller means;

a reverse frequency band information transformer means for restoring enlarged/reduced digital image data from the frequency band information;

a digital to analog convertor means for converting the enlarged/reduced digital image data to an enlarged/reduced analog image signal; and an image output means for outputting said enlarged/reduced analog image signal.

2. An image display in accordance with claim 1, wherein said frequency band information transformer means is a discrete cosine transformer means and said reverse frequency band information transformer means is a reverse discrete cosine transformer means.

3. An image display in accordance with claim 1, wherein said frequency band information transformer means is a discrete Fourier transformer means and said reverse frequency band information transformer means is a reverse discrete Fourier transformer means.

4. An image display in accordance with claim 1, wherein said enlargement/reduction interpolation means does not read the information over the frequency band of an expressable frequency band from the frame buffer at the reduction of the image data.

5. An image display in accordance with claim 1, wherein said frequency band information transformer means, said reverse frequency band information transformer means and said enlargement/reduction interpolation means are possible to be comprised by a microprocessor.

6. An image display in accordance with claim 1, wherein the image display further comprising:

an elimination means for eliminating the image in each frequency band, after transforming the image to the frequency band information temporarily by said frequency band information transformer means, in which an expressable frequency band lowers and a low pass filter preventing an occurrence of a folded quantization noise is realized, at the time of reduction of the image.

* * * * *